INVENTOR.
FRANK J. NEWHOUSE
BY Tweedale & Gerhardt
ATTORNEYS.

INVENTOR.
FRANK J. NEWHOUSE
BY Tweedale & Gerhardt
ATTORNEYS.

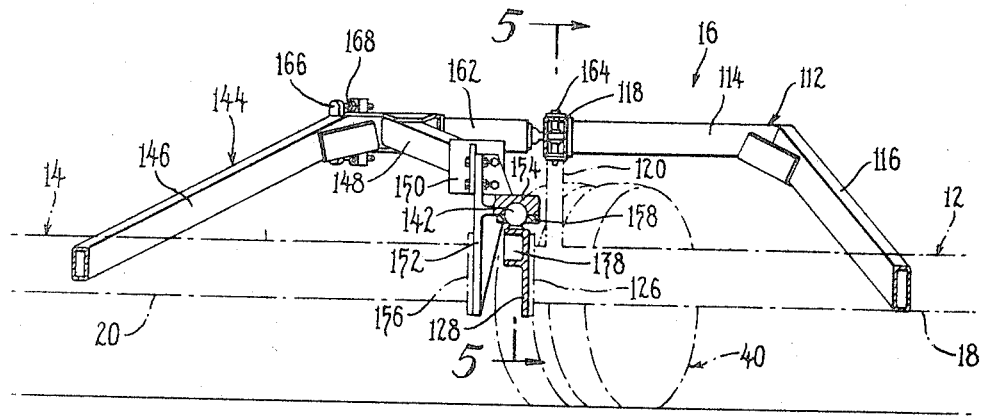
Fig. 4
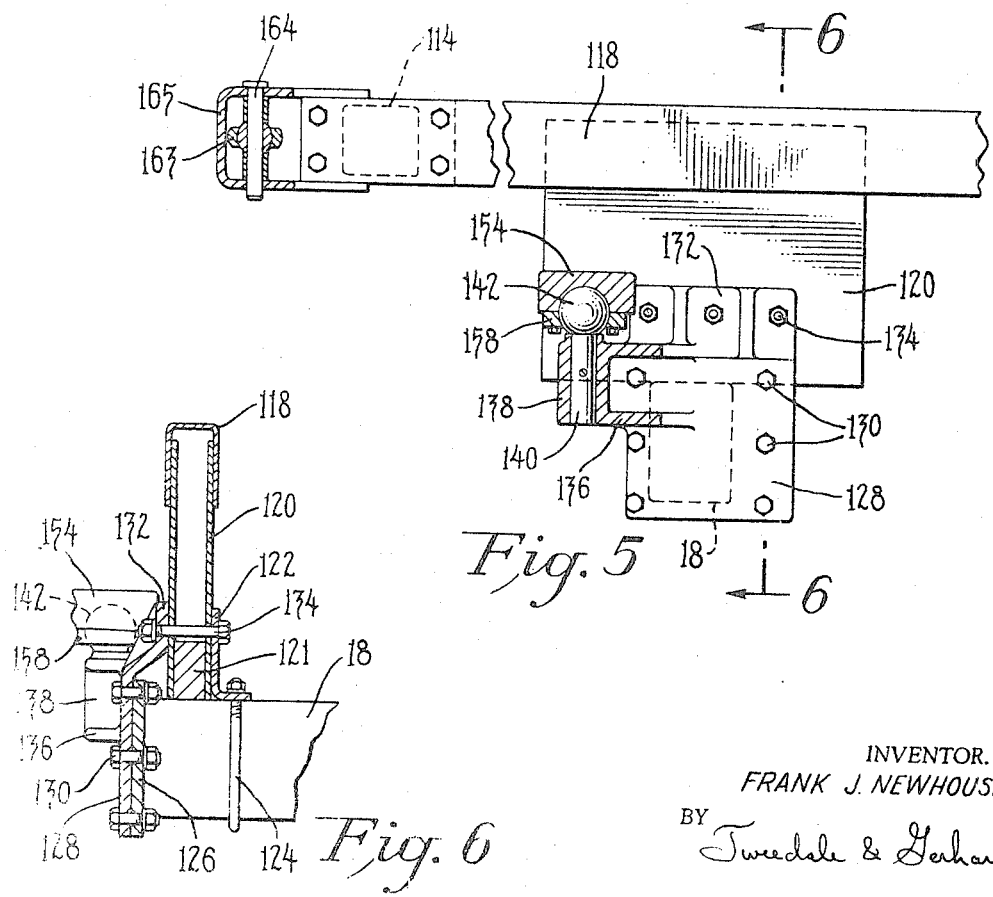
Fig. 5
Fig. 6
INVENTOR.
FRANK J. NEWHOUSE
BY Tweedale & Gerhardt
ATTORNEYS

United States Patent Office 3,487,883
Patented Jan. 6, 1970

3,487,883
MULTIPLE UNIT EARTHWORKING IMPLEMENT
Frank J. Newhouse, Toronto, Ontario, Canada, assignor to Massey-Ferguson Industries Limited, Toronto, Ontario, Canada
Filed Oct. 31, 1966, Ser. No. 590,957
Int. Cl. A01b *49/00*
U.S. Cl. 172—314                     6 Claims

ABSTRACT OF THE DISCLOSURE

An earthworking implement which has two disk harrow units, a ball and a socket pivotally connecting adjacent ends of the units, a frame rigidly mounted to one of the units with a generally fore and aft extending beam, a caster wheel mounted on the aft end of the beam, a forwardly projecting frame rigidly mounted on the other unit, a sleeve member carried by the frame mounted on the other unit, a link connected to the forward end of the frame mounted to the one unit and slidable in the sleeve member, a stop on the link engageable with the sleeve member and surfaces on the forward portion of each of the frames which can contact each other. The stop on the link engages the sleeve member to maintain the disk harrow units in longitudinal alignment when the implement is pulled forward. The surfaces on the forward portion of each frame contact each other and thereby limit folding of one unit relative to the other when the implement is turned.

---

This invention relates generally to earthworking implements and is particularly concerned with disc harrows and similar implements wherein multiple harrow units can be connected together to increase the swath worked by the implement as it is pulled by a draft vehicle.

In accordance with the present invention, a pair of harrow units are pivotally connected together in end to end relatioship and are provided with a duplex coupling arrangement which maintains the harrow units in longitudinal alignment in straight line movement when one of the units is connected with a tractor or other draft vehicle. However, the units may fold toward each other about their pivotal connection during turns, the soil forces on the harrow units causing the units to return to their longitudinally aligned relationship when straight line movement is resumed.

The objects, advantages and features of the invention will become apparent from the following description taken in connection with the accompanying drawings in which:

FIG. 4 is a sectional view taken on lines 4—4 of FIG. 2;

FIG. 5 is a sectional detail view taken on lines 5—5 of FIG. 4; and

FIG. 6 is a sectional view taken on lines 6—6 of FIG. 5.

Figure 1:
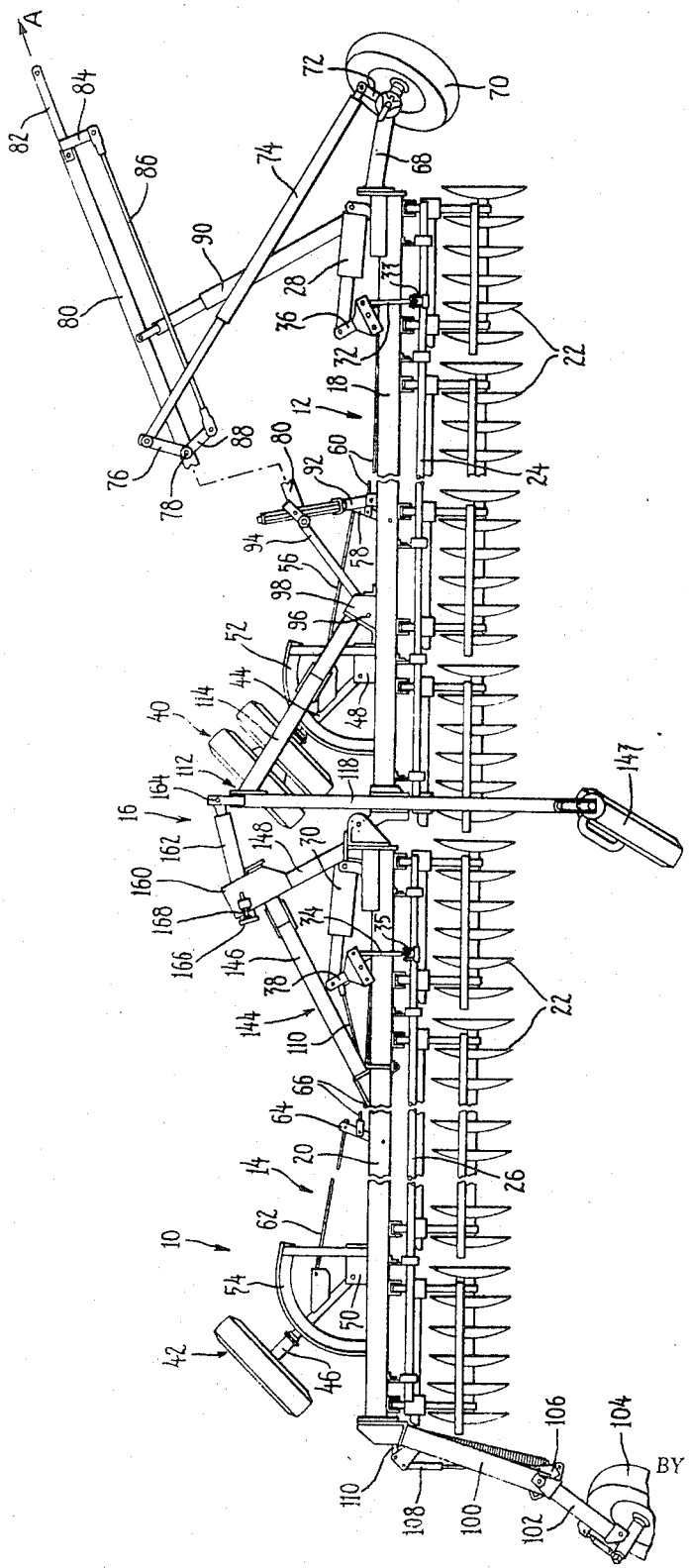
FIG. 1 is a plan view of a multiple unit disc harrow embodying the invention.

In FIG. 1, reference numeral 10 collectively designates an earthworking implement consisting of a pair of harrow units 12 and 14 secured together by a coupling assembly 16. The harrow units 12 and 14 each include main frame members 18 and 20, respectively, on which is supported a plurality of disc gangs 22. Disc gangs 22 are supported on their associated main frames 18, 20 such that they can be raised and lowered between transport and working positions in a well known manner. Mounted on each of the main frame members 18 and 20 in suitable bearings are rotatable lift shafts 24 and 26, respectively, which are interconnected with the gangs such that rotation of the lift shafts raises and lowers the gangs between their transport and working positions. Lift shafts 24 and 26 are actuated by hydraulic rams 28 and 30 mounted respectively on main frames 18 and 20. The piston of ram 28 is pivotally connected with a lever 36 fulcrumed on frame 18 and connected through a link 32 with an actuating arm 33 on lift shaft 24. Similarly, the piston of ram 30 is connected with a lever 38 which in turn is connected through a link 34 with an actuating arm 35 on lift shaft 26 in a conventional manner.

Mounted on the forward sides of the harrow units 12 and 14 near their trailing ends (the left ends as viewed in FIG. 1) is a land wheel assembly 40 and 42, respectively. The land wheels 40 are rotatably mounted on an axle 44 pivotally connected to a support bracket 48 welded or otherwise secured to main frame member 18. Similarly, land wheel 42 of harrow 14 is rotatably mounted on an axle 46 pivotally connected to a support bracket 50 secured to main frame member 20. Land wheels 40 and 42 are shown in their working positions in FIG. 1 and are movable from their working positions to a transport position in which the axles 44 and 46 respectively are disposed substantially 90 degrees with respect to their associated frames 18 and 20. The land wheels may be secured in either their working or transport position by engagement of the axles with arcuate frame members 52 and 54 for the land wheels 40 and 42, respectively, by conventional locking means. Land wheel 40 is actuated about its pivotal connection with support bracket 48 through a linkage 56, 58 and 60 to lever 36 such that actuation of ram 28 simultaneously actuates the disc gangs 22 and land wheel 40 between their transport and working positions. Land wheel 42 is similarly connected through linkage 62, 64 and 66 with lever 38.

Mounted on the leading or right end of the disc harrow unit 12 is an arm 68 on which is supported a front, steerable wheel 70. Wheel 70 is turned about a vertical axis by movement of a steering lever 72 pivotally connected through a link 74 with one arm of a bell crank 76. Bell crank 76 in turn is fulcrumed at 78 on a drawbar 80. Pivotally mounted on the forward end of drawbar 80 is a hitch link 82 for connection with a tractor or similar draft vehicle. Link 82 has an arm 84 connected through a link 86 with an arm 88 of bell crank 76. A telescoping link 90 is connected between drawbar 80 and main frame member 18 of the disc harrow 12. The trailing end of drawbar 80 is adjustably connected with a support arm 92 pivoted on the front of main frame member 18. A bracing link 94 has one end pivotally connected with drawbar 80 and its other end pivotally connected at 96 with a bracket 98 mounted on the front of main frame member 18. Pivotal movement of hitch link 82 about its connection with drawbar 80 caused by changes in direction in the draft vehicle is transmitted through the links 86, 74 and bell crank 76 to steer wheel 70 in accordance with the changes in the direction of the draft vehicle.

Mounted on the trailing or left end of the disc harrow unit 14 is an arm 100 on which is pivotally mounted a swingable arm 102 which carries a rear furrow wheel 104. Arm 102 is interconnected with arm 100 through a latch mechanism 106 which normally restrains arm 102 in its working position as shown in FIG. 1. Latch mechanism 106 is connected through links 108 and 110 with ram 30 such that when the disc gangs 22 and land wheel 42 are actuated to their transport positions by ram 30, latch mechanism 106 is released permitting arm 102 to swing rearwardly into a transport position.

The construction described thus far forms no part of the present invention per se except in its relationship to the novel coupling hitch for securing the harrow units 12 and 14 together.

The duplex coupling 16 for securing the harrow units together includes a coupling frame 112 (FIGS. 2 and 3) mounted on the disc harrow unit 12. The coupling frame 112 includes a frame member 114 having an inclined portion 116 which is secured to bracket 98. The outer, free end of frame member 114 is secured to a beam 118 extending transversely to main frame member 18 in a generally fore and aft direction.

With reference to FIGS. 5 and 6, beam 118 is secured to main frame member 18 by means of an upright support 120 made up of a pair of plates between which is received a spacer 121. Support member 120 is secured to frame member 18 by an angle bracket 122 mounted on main frame 18 by a conventional U-bolt 124. Welded onto the trailing or left end of main frame member 18 is a plate 126. A bracket 128 is secured to plate 126 by bolts or other conventional fasteners 130. Bracket 128 is formed with an upright flange 132 which projects inwardly into engagement with one side of support 120 as shown in FIG. 6, and is secured to support 120 and bracket 122 by bolts 134. Projecting outwardly from bracket 128 is an integral arm 136 terminating in a cylindrical sleeve 138 which receives the spindle 140 of a ball 142. Mounted on the rear, trailing end of beam 118 is a caster wheel 143 of conventional construction.

Projecting forwardly main frame 20 of the harrow unit 14 is a coupling frame 144 including diagonal frame members 146 and 148. Frame member 146 is rigidly secured to main frame 20 by a bracket 147 and U-bolts 149. The outer end of frame member 146 is secured to the outer end of frame member 148. Frame member 148 is secured to a plate 150 mounted on a bracket 152 which in turn is secured to a plate 156 welded onto the inner end of main frame member 20. Bracket 152 has an arm 154 formed with a socket or spherical recess for receiving ball 142. Separation of ball 142 from the spherical recess of arm 154 is prevented by a retainer 158 (FIG. 5). The connection of ball 142 with arm 154 permits substantial universal movement of disc harrow unit 12 with respect to disc harrow unit 14.

Secured to the outer end of frame member 148 is a sleeve member 160 (FIGS. 2 and 3) which slideably receives a link member 162. Link member 162 is formed with an eyelet 163 at one end which is pivotally connected by a pin 164 to a C-shaped strap 165 carried by the forward end of beam 118. A stop flange 166 is formed on the opposite end of link 162 from its pivotal connection 164 which is engageable with an adjustable stop 168 mounted on top of sleeve member 160. Engagement of flange 166 with stop 168 limits the movement of link 162 relative to coupling frame 144. When flange 166 engages stop 168, clockwise pivotal movement of disc harrow unit 12 about the pivotal connection at ball 142 relative disc harrow unit 14 is prevented. Counterclockwise pivotal movement of harrow unit 12 relative to harrow unit 14 is limited by the engagement of the forward portion of beam 118 with a plate 170 mounted on the free end of frame member 146 of the coupling frame 144.

Figure 2:
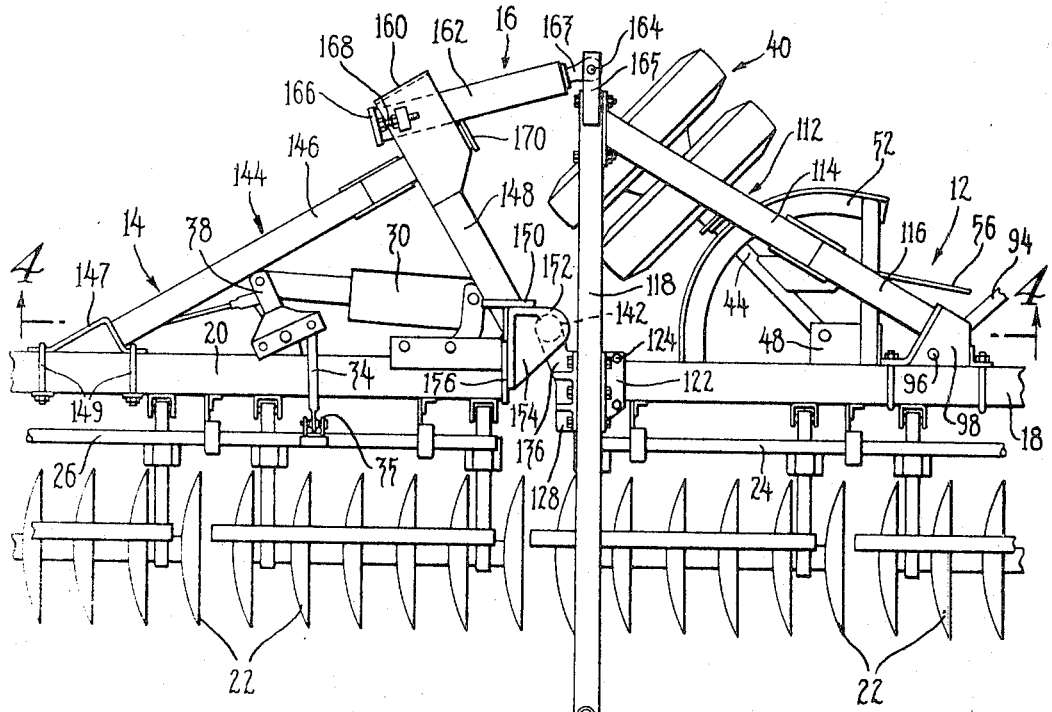
FIG. 2 is an enlarged plan view showing the coupling connecting the harrow units.
Figure 2:
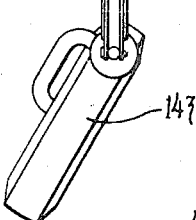
Figure 3:
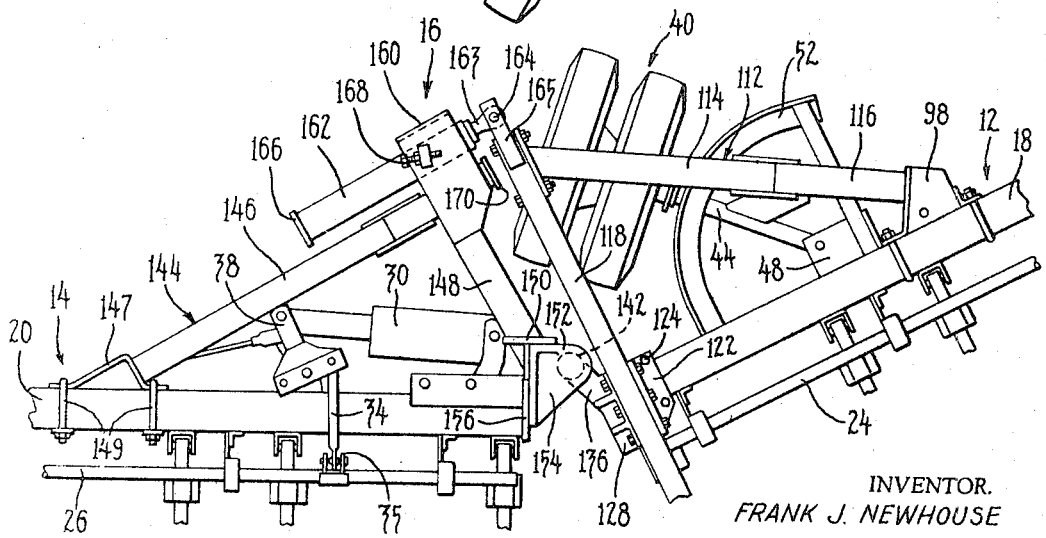
FIG. 3 is a view similar to FIG. 2 with the harrow units shown in their folded position to accommodate turns.

FIGS. 1 and 2 illustrate the relationship of the harrow units during normal working operations wherein the draft vehicle pulls the implement in the direction of arrow A in FIG. 1 causing the disc gangs 22 to work the soil. The soil forces acting on the discs of harrow unit 14 cause the harrow unit to swing in a counterclockwise direction relative to the leading harrow unit 12 until flange 166 on link 162 engages the adjustable stop 168 which maintains the units in longitudinally aligned, end-to-end relationship as shown in FIGS. 1 and 2. However, when the tractor turns toward the left, the leading harrow unit 12 can pivot in a counterclockwise direction as shown in FIG. 3 to accommodate the turn by the tractor, and the caster wheel 143 at the trailing end of beam 118 follows the direction of the tractor around the turn.

While a specific embodiment of the invention has been illustrated and described, other forms of the invention, all falling within the scope and spirit of the invention, will become apparent to those skilled in the art.

What is claimed is:

1. In an earthworking implement comprising a pair of units having a plurality of earthworking tools supported thereon, means coupling said units together such that the units are foldable in a horizontal plane in one direction only from an extended position in longitudinally aligned, end-to-end relationship, said coupling means comprising; means pivotally connecting adjacent ends of said units together, a first frame rigidly mounted on one of said units including a generally fore and aft extending beam extending transversely to said one unit and having a portion projecting forwardly of said one unit and a diagonal frame member extending between said one unit and the forwardly projecting portion of said beam, a second forwardly projecting frame rigidly mounted on the other unit, a sleeve member rigidly attached to the forward portion of said second frame, a link slideably and pivotally supported in said sleeve member, said link having one end pivotally connected to the forward portion of said first frame, stop means on the other end of said link engageable with a stop on said sleeve member when the units are in the extended position, said first and second frames being movable toward each other as said units are folded from the extended positions and said stop member on said link limiting the separation of said frame members and surfaces on the forward portion of said first frame and the forward portion of said second frame which contact each other to limit movement of said first and second frames toward each other as said units are folded from the extended position.

2. The construction claimed in claim 1 wherein said beam has a portion projecting rearwardly of said one unit, and further including a ground engaging wheel mounted on said rearwardly projecting portions.

3. The construction claimed in claim 2 wherein said wheel is a caster wheel.

4. The construction claimed in claim 1 wherein said means pivotally connecting adjacent ends of said units together comprises a ball carried by one of the units and a bracket on the other of said units having a socket receiving said ball.

5. The construction claimed in claim 1 wherein each of said units includes a longitudinal main frame member, and further including an upright support member on the main frame member of said one unit, said beam being mounted intermediate its ends on said upright support member, above said main frame member, and wherein said diagonal frame member extends between said main frame member and the forwardly projecting portion of said beam.

6. The construction claimed in claim 1 further including a longitudinal main frame member for each of said units, and wherein said means pivotally connecting adjacent ends of said units together comprises a bracket fixed to the end of one of said units, an arm on said bracket formed with a cylindrical recess, a ball having a spindle received within said cylindrical recess, a bracket on the end of the other of said units having a socket receiving said ball, and a retainer on said last named bracket for preventing separation of said ball and socket.

References Cited

UNITED STATES PATENTS 1,248,706  12/1917  Porteous _____ 172—584
3,066,746  12/1962  Sweet _____ 172—584 XR ROBERT E. PULFREY, Primary Examiner JAMES W. PETERSON, Assistant Examiner U.S. Cl. X.R.

172—584, 613